United States Patent

Ha

[11] Patent Number: 5,785,297
[45] Date of Patent: Jul. 28, 1998

[54] VALVE MECHANISM

[75] Inventor: Don Dongcho Ha, Long Beach, Calif.

[73] Assignee: Millipore Corporation, Bedford, Mass.

[21] Appl. No.: 682,170

[22] Filed: Jul. 16, 1996

[51] Int. Cl.$^6$ .................................................. F16K 31/02
[52] U.S. Cl. ............................... 251/129.14; 251/129.15
[58] Field of Search ........................... 251/129.14, 129.15

[56] References Cited

U.S. PATENT DOCUMENTS

| | | |
|---|---|---|
| 1,903,248 | 3/1933 | Spence . |
| 2,324,402 | 7/1943 | Kocher . |
| 2,531,479 | 12/1950 | Southern et al. . |
| 2,577,657 | 5/1951 | Houk . |
| 2,591,801 | 6/1952 | Gardner . |
| 2,622,611 | 9/1952 | Stark . |
| 4,218,021 | 8/1980 | Palma .................. 251/129.14 |
| 4,245,789 | 1/1981 | Gray .................... 251/129.14 |
| 4,481,699 | 11/1984 | Knapp et al. ........... 251/129.14 |
| 4,483,485 | 11/1984 | Kamiya et al. ......... 251/129.14 |
| 4,683,454 | 7/1987 | Vollmer et al. ......... 251/129.15 |
| 4,695,034 | 9/1987 | Shimizu et al. . |
| 4,712,767 | 12/1987 | Losser et al. . |
| 4,930,746 | 6/1990 | Reinicke et al. ........ 251/129.14 |
| 4,977,916 | 12/1990 | Ohmi et al. . |
| 4,997,004 | 3/1991 | Barkhimer . |
| 5,040,559 | 8/1991 | Ewing . |
| 5,094,430 | 3/1992 | Shirai et al. . |
| 5,100,100 | 3/1992 | Benson et al. . |
| 5,135,027 | 8/1992 | Miki et al. ............. 251/129.14 |
| 5,145,147 | 9/1992 | Nakazawa et al. . |
| 5,165,655 | 11/1992 | Drexal et al. . |
| 5,361,800 | 11/1994 | Ewing . |

FOREIGN PATENT DOCUMENTS

| | | | |
|---|---|---|---|
| 2208183 | 8/1973 | Germany .............. | 251/129.14 |
| 0129976 | 8/1982 | Japan ................... | 251/129.14 |

*Primary Examiner*—Denise L. Ferensic
*Assistant Examiner*—John Ball
*Attorney, Agent, or Firm*—Fulbright & Jaworski L.L.P.

[57] ABSTRACT

A valve mechanism incorporates an unattached valve gate structure having a curved surface facing a valve seat and also having a flat surface. A gate structure mount movable with a controller has a flat mounting surface that faces the flat gate structure surface. The two flat surfaces abut one another, and, in use, this abutment is maintained by the flow of the fluid through the valve seat. The valve gate structure may include a holder having the flat gate structure surface along with a ball member held in the holder and having the curved gate structure surface.

16 Claims, 5 Drawing Sheets

VALVE MECHANISM

FIELD OF THE INVENTION

The field of the invention pertains to valve mechanisms to control fluid flow.

BACKGROUND OF THE INVENTION

A ball acting against an associated seat is commonly used in fluid flow control valves. Typically, the ball is fixed to another member by mechanical linkage and moved by that member in determining the fluid flow through the valve. A conventional example is the connection of the ball by a thin linkage rod to the other member.

Although linkage such as this tends to establish predictable and well-guided control of the motion of the ball, difficulty in shut-down commonly results from ball-to-seat misalignment in conjunction with the inability of the mechanism to re-align itself. Mechanical complexity also often exists in such arrangements.

In an alternative, floating-ball design, the ball is free and is brought into and maintained in contact with the other member, that moves the ball, by the force of the pressure flow of the fluid. Enhanced simplicity and an enhanced capability for self-alignment can result from such arrangements. In these arrangements, the absence of restrictions on the ball in the lateral direction in some respects can be addressed by guiding geometry of the valve seat adapted to bring the ball into proper alignment during a closing operation. However, without a sufficient guiding force, the ball may break into chattering, fluttering, or other types of instabilities when the fluid flow creates an exciting force above a certain magnitude. Also, with problems that can arise in guiding of the ball, misaligned parts will typically generate friction during closing operations and potentially lead to foreign particle generation and/or loss of the capability for valve shut-down.

In free-floating designs, the desire for lateral guiding outside of that from the seat has been the subject of effort and concern. Conventional examples are the use of a cup-shape or a taper geometry incorporated into the structural member that immediately acts against the ball to move it. Another example is the use of a thin flexible member bent around and holding the ball at one end and fixed to the wall of the valve cavity for the ball at the other end. The flexible member, then, allows the ball to move, but also provides a guiding force.

The present invention is directed to addressing these areas of concern in such fixed and floating valve configurations, consistent with ease and efficiency of operation and construction of the valve mechanism.

SUMMARY OF THE INVENTION

In accordance with the invention, a valve mechanism to control the flow of a fluid, includes pipe structure for carrying the fluid, a valve seat mounted in the pipe structure, and a movable valve controller. There then is provided a valve gate structure having a curved surface that faces the valve seat and also a substantially flat surface, along with a gate structure mount that is movable with the controller and that has a substantially flat mounting surface facing the substantially flat surface of the gate structure.

The gate structure is unattached; and the substantially flat surface of the gate structure abuts the substantially flat mounting surface, so held in such abutment by the flow of the fluid through the valve seat. The substantially flat mounting surface may be broken by a curved surface.

The valve mechanism includes a solenoid actuator to move the valve controller and adjust the flow of the fluid through the valve seat. In the actuator, a sleeve of a non-magnetic material is disposed about the movable controller, and a solenoid coil disposed about the sleeve provides a magnetic field to move the controller.

The gate structure may include a holder having the substantially flat gate structure surface, and a ball member held in the holder, having the curved gate structure surface.

In accordance with other related aspects of the invention, a valve mechanism to control the flow of a fluid includes pipe structure, a valve seat and a movable controller as initially set forth. Then, in the mechanism, there is also provided an unattached valve gate structure having a substantially flat surface, and a gate structure mount, movable with the controller and having a substantially flat mounting surface facing the substantially flat surface of the gate structure. The valve mechanism also includes other features generally in accordance with a number of features described above.

DETAILED DESCRIPTION

Figures 1, 6:
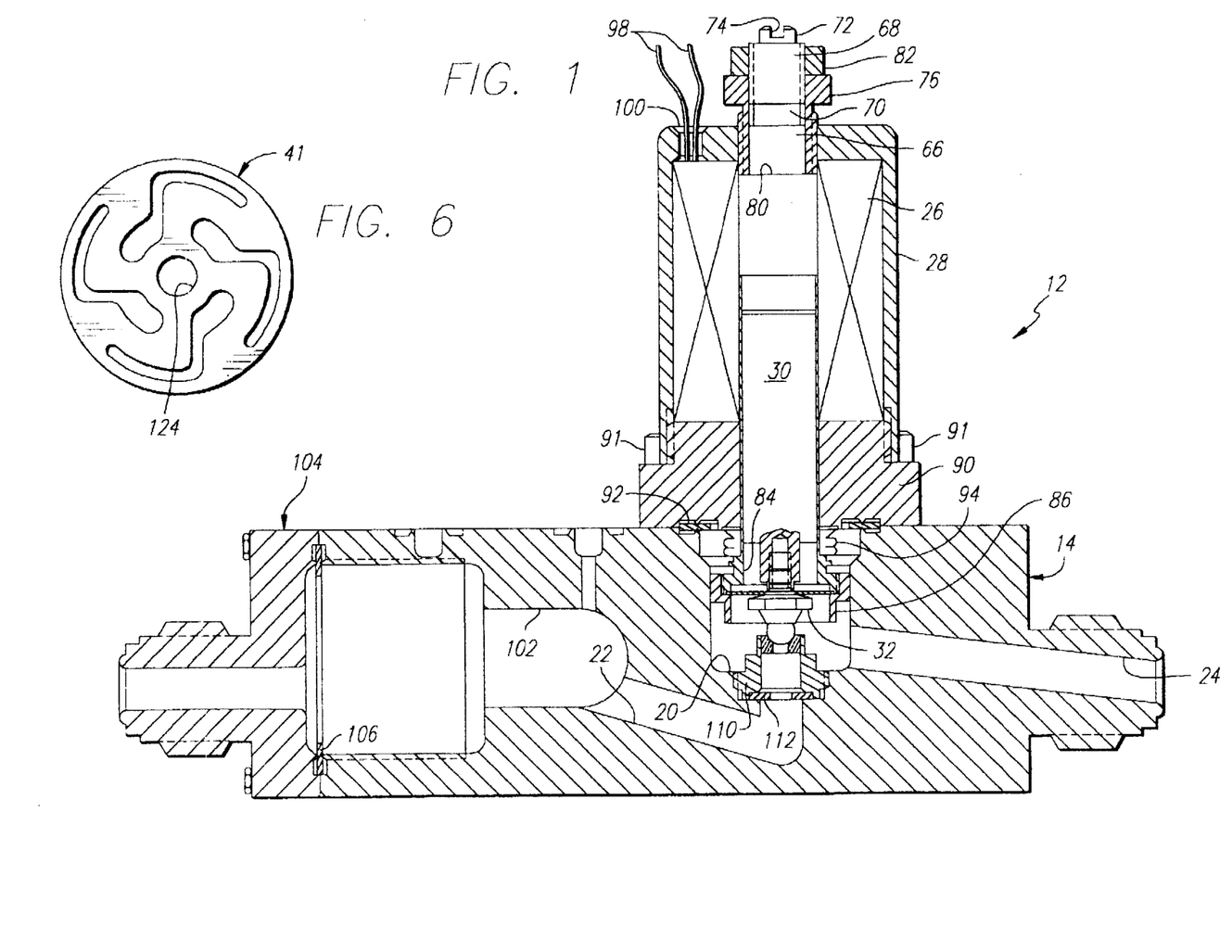
FIG. 1 is a cross-sectional view showing a valve mechanism in accordance with the invention.
FIG. 6 is a plan view showing a spring used in the valve mechanism of FIG. 1.

By way of summary and introduction, in FIG. 1, there is shown a valve mechanism 12 in its fully closed position.

A conduit block 14 that is used in providing the valve mechanism has an intermediate valve cavity 20 for various parts of the valve mechanism, an input conduit 22 into the cavity and an output conduit 24 from the cavity.

The valve mechanism 12 is magnetically operated, with the cross-hatching representing, in standard fashion, a conventional solenoid coil and bobbin 26 with the coil wound on the bobbin, and with the coil and bobbin covered by a housing 28 for the solenoid made of magnetic material.

The changing magnetic field from the coil in the valve mechanism 12 varies the force along the upward and downward direction on a controller 30 to which a gate mount 32 is fixed. The controller is also made of magnetic material.

Figure 2:
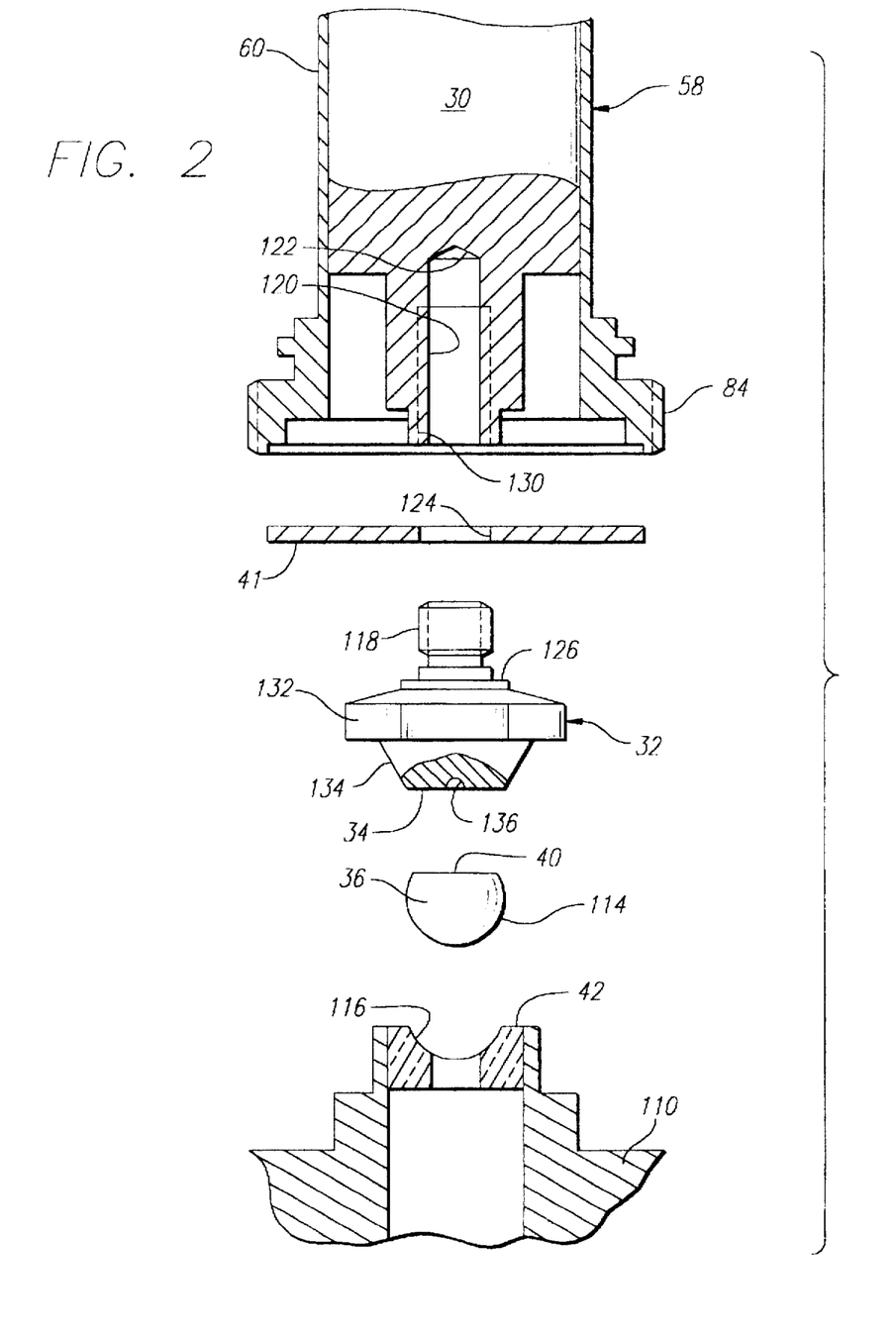
FIG. 2 shows a part of the view of FIG. 1, enlarged and partially exploded.
Figure 3:
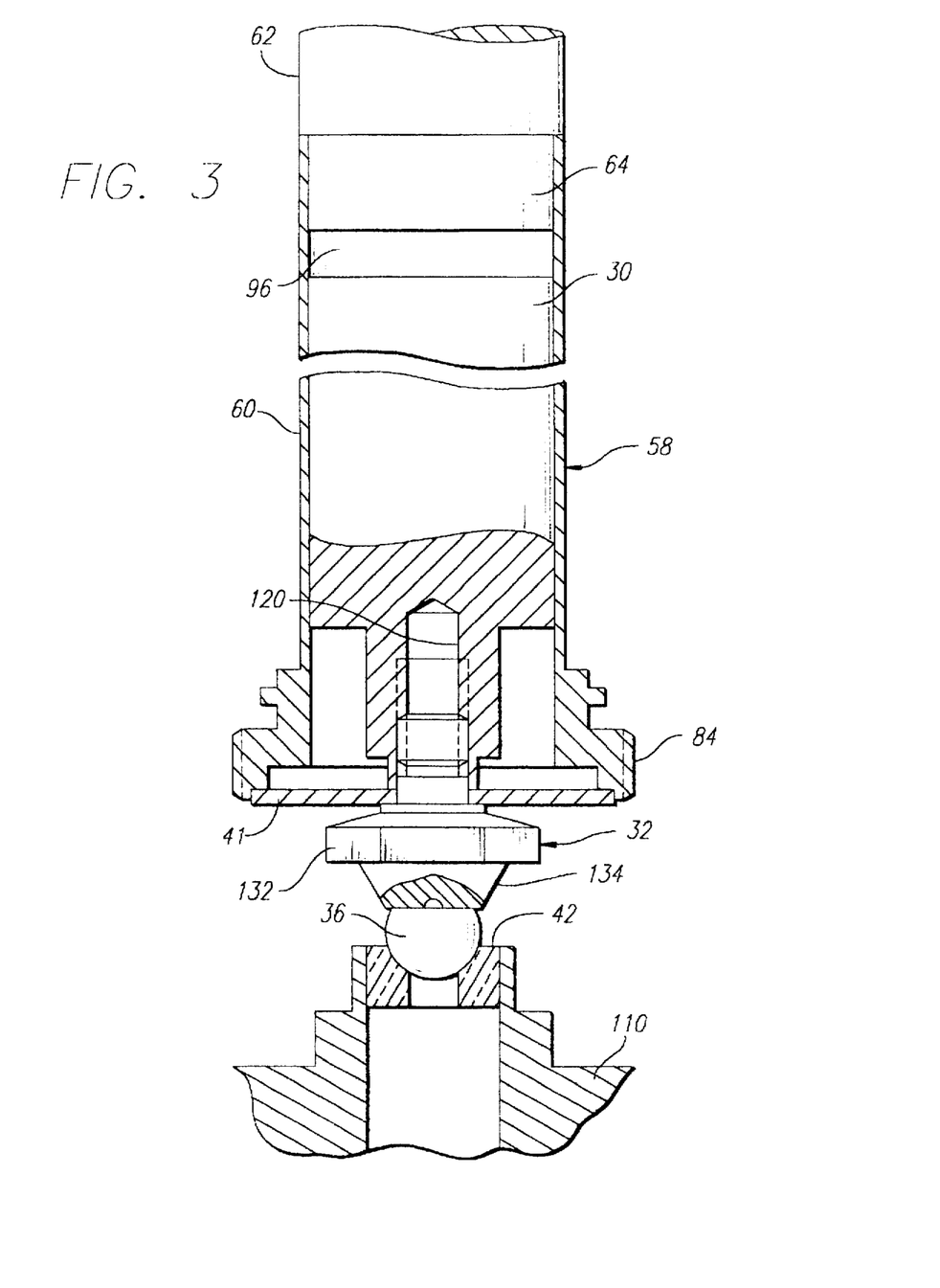
FIG. 3 shows a part of the view of FIG. 1, enlarged and partially broken-away.

In FIG. 3, a portion of the valve mechanism 12, in FIG. 1, is shown in an enlarged form, and in FIG. 2, a portion is shown in an enlarged and exploded form. Referring to those figures, the valve gate mount 32 has a flat mounting surface 34 having an annular shape. Then, the gate structure 36 for the valve takes the form of a sphere (a ball) having a section removed to provide a flat, circular gate structure surface 40 perpendicular to a diameter for the sphere. The position of the flat gate structure surface 40 leaves the gate structure as somewhat larger than a hemisphere. However, of course, this could be varied, with the portion of the flat gate structure leaving the gate structure somewhat smaller than a hemisphere or, in fact, equal to a hemisphere.

3

The gate structure 36 is unattached to the valve gate mount 32 and not attached to any other structure. Thus, it is an unattached part of the valve mechanism 12.

The valve mechanism shown has a normally-closed operation. As can be seen in FIGS. 1 and 3, with the mechanism in its fully-closed position, the flat mounting surface 34 of the valve gate mount 32 and the flat gate structure 40 not only face one another, but are held against one another in an abutting relationship, with the valve gate structure 36 stopped below by a valve seat 42 and subject to a downward force from the valve gate mount 32, above.

With the valve mechanism not in operation, the downward force of a disk spring 41 (plus any weight of parts that are involved in a downward force) are sufficient to maintain the abutting relationship. With the valve mechanism in operation, but maintained closed, the downward force of the spring (plus any weight of parts that are involved in a downward force) are sufficient to maintain the gate structure 36 against the valve seat 42, countering and overcoming the upward force against the gate structure of the gas fluid in the input conduit 22 and in the portion of the valve cavity 20 below the gate structure 36 that is used in the fluid flow during operation.

Figure 4:
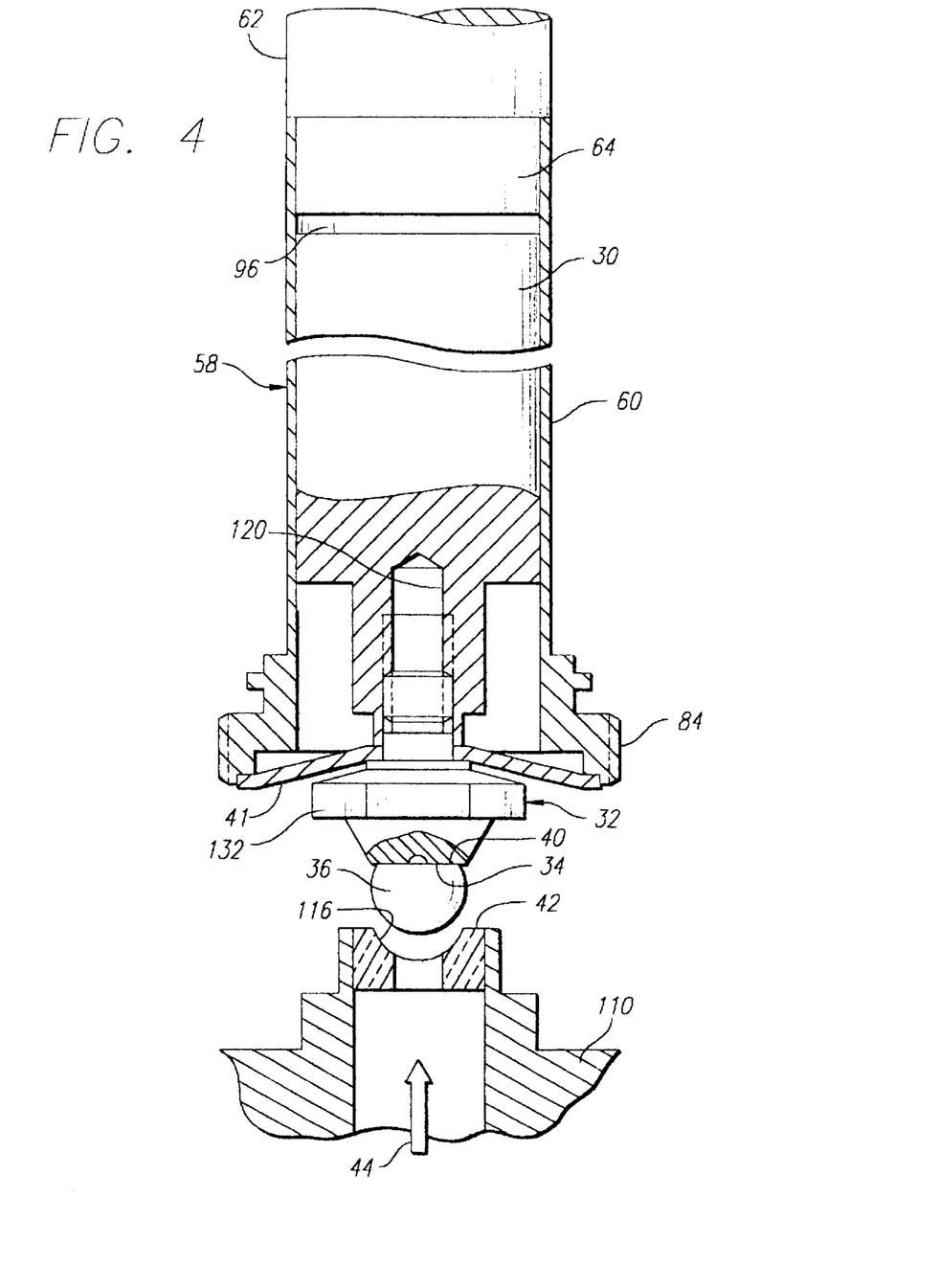
FIG. 4 is the same view as FIG. 3 but with the valve mechanism in a moved position.

On the other hand, as shown in FIG. 4, which shows the same portion of the valve mechanism as FIG. 3, but with the valve position adjusted by the solenoid force, to one open position, with the gas flowing, the abutting relationship between the flat gate structure surface 40 and the flat mounting surface 34 is maintained by the force of the fluid flow, represented by the fluid flow arrow 44 in FIG. 4. As indicated, the valve mechanism is an adjustable valve with many open positions, to adjust the fluid flow, as opposed to a simple on-off valve mechanism.

As can further be seen by reference to FIG. 4, if, with the valve in an open position as in FIG. 4, the gas flow were cut-off independently of this valve mechanism, the valve gate structure 36 would separate from the valve gate mount 32, and the valve gate structure 36 would drop to a position against the valve seat 42. This will break the abutting relationship between the flat mounting surface 34 and the flat gate structure surface 40. However, when the valve mechanism is then cycled into its normally-closed position, the abutting relationship will be re-established and the alignment of the valve gate structure 36 as part of the valve mechanism will also be re-established by the abutting relationship.

Figure 5:
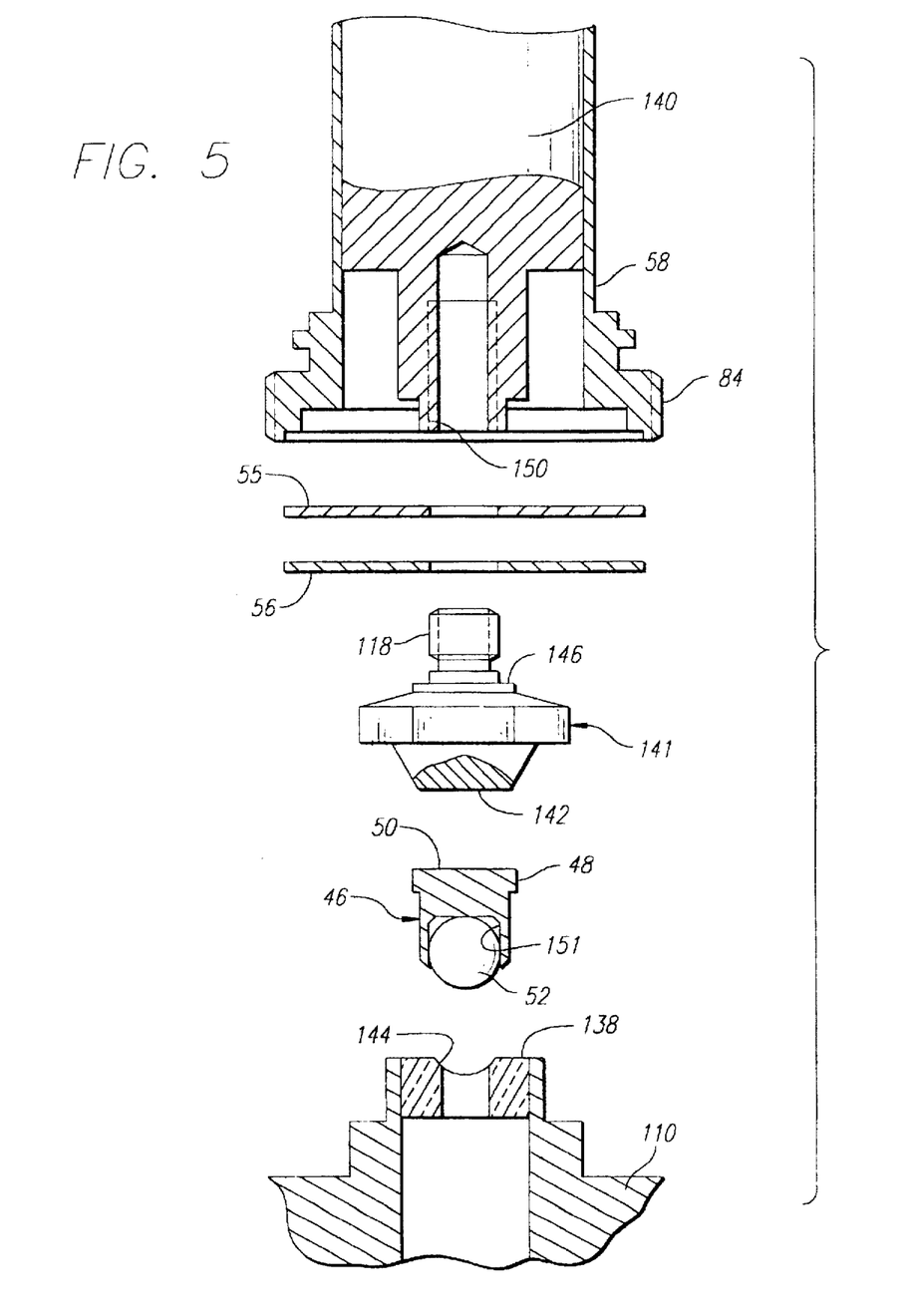
FIG. 5 is a cross-sectional view, partially exploded, showing an alternative embodiment for a portion of the valve mechanism.

In FIG. 5, there is an alternative gate structure 46, shown in an alternative valve mechanism that is designed for lower flow with a higher resolution of control. This gate structure 46 has a ball holder 48 that has a flat gate structure surface 50. This holder is for a sphere (ball) having a smaller radius than that applicable to the gate structure 36 of FIGS. 1 through 4, to operate in the lower flow situation with a higher resolution.

In the assembly, adjustment and operation of the valve mechanism 12 of FIGS. 1 through 4, as previously referenced, the disk spring 41 is used. A plan view of the spring is shown in FIG. 6. With regard to the spring, and by way of example, the thickness of the spring may be varied in alternative valve mechanism embodiments, and multiple springs may be used, depending on the particular specifications and requirements. In accordance with this, in the valve mechanism embodiment of FIG. 5, a pair of springs 55 and 56 are used. For purposes of illustration, and as an example, they are assumed to have the same plan-view appearance as the spring 54 of FIG. 6, but could have a different thickness.

4

Now turning to various aspects in additional detail, in the valve mechanism 12 of FIGS. 1 through 4, the controller 30, made of magnetic material, is mounted within a sleeve assembly 58 to move up and down with changes in the magnetic force form the solenoid coil. The sleeve assembly incorporates a sleeve 60. It also incorporates a sleeve mount 62 that is made of magnetic material. The top of the sleeve 60 fits about a reduced lower end 64 of the mount, and the two parts are welded together along this joint to create an hermetic seal. The upper end of the sleeve mount has four different sections. As can be seen in FIG. 1, there is an unthreaded reduced section 66, a threaded reduced section 68 having outward threads, and an intermediate reduced section 70 having a diameter that is reduced further beyond the diameter of the unthreaded reduced section and the diameter to the outside of the threads for the threaded reduced section. At the top of the sleeve mount, there then is a screw driver connection 72 having a slot 74 to be used to turn the sleeve mount 62 and sleeve 60 in assembling the valve mechanism and adjusting their position during assembly or during a subsequent adjustment procedure.

Along the upper end of the sleeve mount 62, an adjustment nut 76, made of magnetic material, has outward threads that are used in threading the adjustment nut into an inwardly threaded opening through the top of the solenoid housing 28. With the sleeve mount 62 and sleeve 60 adjusted to their desired position, the adjustment nut can be turned to adjust its position against a shoulder 80 of the sleeve mount formed by the onset of the unthreaded reduced section 66 of the upper end of the sleeve mount. A lock nut 82, threaded on the outward threads of the threaded reduced section 68 of the upper end of the sleeve mount 62, is tightened on this upper end against the adjustment nut.

At the lower end of the sleeve 60, there is a thickened sleeve mouth 84 (e.g., FIG. 3) carrying along a lower portion of the mouth, outward threads that are threaded into the inward threads of a sleeve assembly support 86 (FIG. 1). This support, while threaded to the sleeve 60, has some clearance in the valve cavity 20 of the conduit block 14, so it can move upward or downward somewhat in the valve cavity.

The solenoid housing 28 has an inwardly threaded lower portion to thread the housing on outward threads of a flange piece 90 of the valve mechanism 12. The flange piece, made of a magnetic material, is bolted to the conduit block 14 using four circumferentially arranged bolts 91 (two shown in FIG. 1). A washer 92, made of a relatively soft metallic material, such as a nickel material, is pressed between the flange piece 90 and the conduit block. A bellows 94, made of a metallic material, such as a stainless steel material, is welded at one end to the flange piece 90 and at the other end to the sleeve assembly support 86 to provide an hermetic seal, while also permitting the up-and-down adjustment of the sleeve assembly and sleeve assembly support 86 during the initial assembly of the valve mechanism or during a subsequent adjustment.

As can best be seen in FIGS. 3 and 4, an air gap 96 exists between the upper end of the movable controller 30 and the lower end 64 of the sleeve mount 62. With the variation of the magnetic force provided by the solenoid, the force on the controller 30 varies, thus causing the controller to move upward or downward, changing the air gap 96 and the position of the valve gate 36. Thus, the fluid flow through the valve is adjusted. The magnetic circuit involved in this change in force runs through a number of components which are made of magnetic material, specifically, the solenoid housing 28, the adjustment nut 76, the sleeve mount 62, the controller 30 and the flange piece 90. The basic arrangement of components such as these, with the air gap, is conventional and well known. In FIG. 1, a pair of leads 98, from an electrical terminal 100 are connected to the end wires of the solenoid. Of course, the end wires of the solenoid could themselves exit the housing to an external terminal or other external connections. The electronic components and circuitry used in changing the electrical signal to these leads and thus varying the magnetic field can be conventionally provided and forms no part of the invention.

Although the valve mechanism can be used in a variety of types of fluid flow control apparatus, it is particularly well suited to mass gas flow controllers which sense the mass of gas flow and adjust the flow to a desired level based on, e.g., comparing an electrical signal corresponding to the existing flow and an electric signal setting corresponding to a desired flow. In accordance with this, the particular conduit block 14 in FIG. 1 is shown with an initial fluid flow cavity having an enlarged space for a fluid flow restrictor, that will limit the fluid flow along the restricted path, and having entrance and exit openings for a flow path parallel to the restricted path, which would typically contain a sensor, with the total fluid flow being determined by the sensor from the portion of the flow running through the sensor. Such techniques, including, for example, the use of a small diameter sensor conduit with a pair of sensor coils wrapped about the conduit, in determining the fluid flow, are commonly used and well known. Of course, other conventional approaches and techniques can alternatively be used.

Further, in FIG. 1, the conduit block 14 is shown with threads at its output for connection to another part that would continue the fluid flow path. Similarly, in the particular arrangement of FIG. 1, at the input, the conduit block is attached to another conduit piece 104 having similar connection threads at the input, with a metallic washer, made of a soft metallic material, such as a nickel material pressed between the pieces. The attachment of the conduit block to the conduit piece is by four bolts 106, two of which are shown.

Returning to the operation of the valve mechanism 12 of FIG. 1, the valve seat 42 is press-fit into a valve seat mount 110. The valve seat mount itself is provided with outward threads so that it can be screwed into position using inward threads along the corresponding portion of the valve cavity 20. A washer 112, made of a soft metallic material, such as a nickel material, is pressed between the valve seat mount 110 and an upwardly facing wall of the valve cavity.

Both the valve structure 36 and the valve seat 42 may conveniently and effectively be made of an aluminum oxide material, such as a synthetic ruby or sapphire material. Of course, they can also be made of other materials, including for example, metallic, stainless steel materials.

In the valve mechanism 12 of FIGS. 1 through 4, as is readily apparent, the curved, spherical form surface 114 of the gate structure 36 faces and interacts with an associated curved, spherical form surface 116 of the valve seat. It is convenient and efficient for the radius applied to the spherical form surface of the valve seat to be somewhat larger than the radius for the spherical form surface of the valve gate structure so that the sealing interaction of the gate structure against the valve seat is along a line rather than along a spherical form surface. This provides well-understood advantages in efficient manufacture, assembly and operation of the valve mechanism. A smaller radius than that applicable to the valve gate structure could also be employed to provide a line contact at a different point. Alternatively, of course, as another example, a conical form surface for the valve seat could readily be substituted.

The valve gate mount 32, shown in FIGS. 1 through 4, has a shape and form that is convenient for use in fluid flow while providing the desired flat mounting surface 34 and adapted for connection to the movable controller. The mount, as is apparent from the drawings, is symmetrical about a longitudinal axis. It has a barrel portion 118 having outward threads to thread the mount 32 into an inwardly threaded portion of a connection cavity 120 into the lower end of the movable controller 30. In this fashion, the vertical position of the valve mount with respect to the connection cavity can be set in initial assembly and, as needed, in any subsequent change or adjustment. A taper portion 122 at the top of the connection cavity 120 simply reflects the practical formation of the connection cavity using a drill bit having the typical end taper.

In position, the disk spring 41, along its circumferential portion about its center opening 124 (FIG. 6) is pressed against and pushes downwardly on a spring shoulder 126 of the valve gate mount 32. A projecting ridge 130 at the lower end of the movable controller acts as an abutting stop along this portion of the spring with the spring in its assembled position. Along an outer circumferencial portion of the spring 41, the spring, as shown in FIG. 1, is pressed between the sleeve mouth 84 and the sleeve assembly support 86. The force of the spring adds to the stability, including laterally, of the valve mechanism in its assembly and initial setting and in any subsequent change or adjustment.

The valve gate mount 32 has an hexagonal band 132 which can be conveniently used to turn the mount with a tool, and which could also readily be octagonal or some other shape. At the bottom of the valve gate mount 32, there is a generally frusto-conical portion 134 providing at its lower end, the flat mounting surface 34 that faces and abuts the flat gate structure surface 40. This generally frusto-conical form is particularly convenient. Specifically, if a particular implementation calls for a gate structure 36 having a smaller size with a flat gate structure surface 40 that is smaller (with, presumably a smaller valve seat), the generally frusto-conical portion of the valve gate mount can be lengthened, providing a smaller flat mounting surface 34. Similarly, if the opposite variation is required by the implementation, the generally frusto-conical portion can be shortened from the bottom, providing a larger flat mounting surface.

The generally frusto-conical portion 134 of the valve gate mount 32 in FIGS. 1 through 4, has a flat mounting surface 34 that, in fact, is broken by a curved, spherical form cavity 136 having a center coincident with the center of the flat mounting surface. In the embodiment of FIGS. 1 through 4, this cavity, thus, is assumed to be hemispherical, although it may certainly not have such a coincident center and may be smaller than or larger than a hemisphere. This opening, in the particular embodiment, exists because in a machining procedure which can conveniently and efficiently be used in forming such a valve gate mount, the lower end surface for the mount, as initially formed, may typically, near its center, not have the flatness to the degree required. Therefore, in these figures, a center opening 136 is shown to indicate a method that can be used to preserve the flatness required if, for example, such a manufacturing technique is used.

The spring 41, as shown in FIG. 6, is a conventionally-implemented disk spring having "cut-outs" shaped and positioned to provide the desired spring characteristics in the assembly, adjustment and operation of the valve mechanism 12 of FIGS. 1 through 4.

In FIG. 5, alternative parts for a number of parts of the valve mechanism 12 of FIGS. 1 through 4, are shown. These alternative parts include the alternative gate structure 46, incorporating the holder 48 and sphere 52, previously referred to. There is also an alternative valve seat 138 and the pair of alternative disk springs 55 and 56, previously referred to. Additionally, there is an alternative movable controller 140 which may be assumed to be identical to the movable controller 30 of FIGS. 1 through 4 apart from some dimensional changes, for example, a somewhat shorter overall length and a somewhat smaller overall, outside diameter. Finally, the valve mount 141 is identical to the valve mount 32 of FIGS. 1 through 4, apart from the absence of a center cavity, such as the center cavity 136, which is assumed not required for the flatness of the flat mounting surface 142 of this valve mount 141. Thus, the flat mounting surface for this valve mount is not a surface that is broken.

As is readily apparent from the appearance of the alternative parts in FIG. 5, the alternative embodiment of the valve mechanism incorporating such parts is adapted for controlling lower flow rates, with a higher resolution. In accordance with this, to interact with the smaller spherical form radius of the sphere 52, the alternative valve seat has a smaller fluid flow opening and a smaller curved, spherical form surface 144 than the spherical form surface 116 for the initially described valve seat 42. Again, here, to provide a line contact between the sphere and this surface, the surface has a somewhat larger radius for its spherical form than that applicable to the sphere 52. However, as before, the same radius, a smaller radius than that applicable to the sphere to provide a line contact at a different point, or, alternatively, e.g., a conical form for the surface could also be used.

Similar to the situation for the embodiment of FIGS. 1 through 4, in FIG. 5, the valve mechanism as assembled will have the lower spring 56 abutting against a spring shoulder 146 of the valve mount 141. The upper spring 55, then, while abutting the lower spring, will also abut the ridge 150 at the lower end of the movable controller 140. Additionally of course, the valve mechanism is adjustable to varying open positions to adjust the fluid flow to the desired rate, dependent upon the force on the movable controller 140 resulting from the magnetic field provided by the solenoid coil.

As with the flat gate structure surface 40 of the gate structure 36 of FIGS. 1 through 4, it is desirable to have the circular, flat gate structure surface 50 of the gate structure 46 in FIG. 5, have a diameter that is similar to the diameter for the abutting circular mounting surface of its valve mount 141. These diameters can be somewhat different. For example, in FIG. 5, the diameter of the gate structure surface is assumed to be slightly larger than the abutting mounting surface. In FIG. 2, to the contrary, the circular flat gate structure surface 40 is assumed to have a slightly smaller diameter than that applicable to the abutting flat mounting surface 34.

In FIG. 5, the sphere cavity 151 in the holder 48 is sized and shaped to hold the sphere 52 in press-fit fashion. Thus, the diameter of that cavity's circular entrance opening is somewhat smaller than the diameter of the sphere 52. At the base of the cavity, there is then a yet smaller diameter circular surface. To conveniently and efficiently hold the ball, the cavity wall is straight for a length leading from the entrance opening and then tapered to meet the circular base surface. As can be seen, the holder is symmetrical about a central axis.

The valve gate mounts and the valve gate structures, as described and shown, among other concerns, are adapted to address the matter of misalignment which arises from, e.g., valves which use fixed ball or ball-like structures in controlling fluid flow. Additionally, the flat, abutting gate structure and mount surfaces address concerns with lateral stability in various forms of free-floating, e.g., ball or ball-like arrangements.

As somewhat already indicated, the embodiments shown, or readily apparent variations in those embodiments, can be adapted to a variety of fluid flow ranges and degrees of resolution. As an example, merely by way of illustration, four different flow rate ranges can be provided: range 1—from about 10 to about 300 standard cubic centimeters per minute; range 2—from about 300 to about 1,000 standard cubic centimeters per minute; range 3—from about 1,000 to about 10,000 standard cubic centimeters per minute; and range 4—from about 10,000 to about 30,000 standard cubic centimeters per minute. Then, by way of further illustration, the valve mount and gate structure forms in the arrangement shown in FIGS. 1 through 4 can be conveniently and efficiently employed, e.g., for ranges 3 and 4, with for range 3, a valve gate structure 114 having an applicable diameter of about ⅛ inch and with a flat mounting surface 34 having an applicable diameter also of about ⅛ inch. Then, for range 4, a valve gate structure having an applicable diameter of about 3/16 inch can be conveniently and efficiently used with a valve gate mount having a flat mounting surface also of about 3/16 inch. As previously referenced, a shortened frusto-conical portion 134 can be used to provide this larger size. Springs having a diameter of about ½ inch are also convenient and efficient with, for example, for range 3, a thickness of about 9 mils, and for range 4, a spring thickness of about 8 mils.

For ranges 1 and 2, the arrangement of FIG. 5 is convenient and efficient with, for example, a sphere 52 having a diameter of about 1/16 inch, with a diameter of the flat gate structure surface 50 of about ⅛ inch, and with the two springs 55 and 56 having thicknesses of about 9 mils each. As indicated, in the configuration of FIG. 5, the movable controller 140, e.g., may conveniently have a somewhat smaller overall length and somewhat smaller outside diameter than in the configuration of FIGS. 1 through 4. However, in respect to this, as already indicated, this may vary with individual specifications and requirements. In that regard, for range 1, such a slightly smaller size has been found to be convenient and efficient, while for range 2, an unchanged size has been found appropriate.

Further in regard to this, as an overall consideration, a tendency to a somewhat shorter movable controller with a somewhat longer stroke length, along with a somewhat weaker spring, with a higher flow range, would be a typical approach. However, where the flow rate becomes very low, as in range 1, with very high resolution, this tendency can reach mechanical and other operational limitations. Therefore, for the very low flow rates, shortening the controller and decreasing its outside diameter somewhat has been found to be convenient and effective, with a shortened stroke being associated with this shorter controller, rather than a longer stroke, through adjustment of the magnetic field strengths that are used. In connection with this, the removable controller is typically slidably mounted in the sleeve 60, so the inward surface of the sleeve and the outward surface of the controller contact one another during movement of the controller. However, for example, for the very low flow rate range, the somewhat smaller diameter of the movable controller can result in no contact at all of this sort, thus increasing the level of performance under the very low flow rate conditions. Thus, the movable controller, in these circumstances, effectively can be floating within its sleeve 60 during operation of the valve mechanism.

The metallic parts of the valve mechanism, apart from those already described as of a nickel material, can be formed from conventional stainless steel materials. Of course, other metallic materials may also be used. As already indicated, for the magnetic circuit, which includes the solenoid housing, the adjustable nut, the sleeve mount (but not the sleeve itself), the movable controller, and the flange piece, the stainless steel material should also be a magnetic material, for use in this magnetic circuit. As is typical, the metallic wire forming the solenoid coil can be conveniently electrically insulated with a conventional material, such as an enamel or a polyamide material.

The embodiments show in FIGS. 1 through 6 employ a valve gate structure having a spherical form surface to interact adjacent to the valve seat. However, gate structures having differently shaped surfaces to interact adjacent the valve seat could be provided while still maintaining a flat surface to abut the valve mount shown, or a similar valve mount. For example, a conical form surface, e.g. conical or frusto-conical, could be employed with, e.g., an appropriate conical form or spherical form interacting seat surface. The curve and taper of such a conical form surface have advantageous aspects related to the advantages of the spherical form surface in respect to interaction with a gas flow and maintaining stability while unattached. A gate structure having a flat surface interacting adjacent the seat could also be employed with, e.g., a flat interacting seat surface. However, its operation would be expected to present disadvantages. Again, of course, the involved gate structure would have a flat surface to abut the flat gate mount surface.

As indicated, the embodiments shown in FIGS. 1 through 6 and as described above, provide a normally-closed operation. However, typically, a normally-open operation is desired as an alternative. To provide this, a variety of conventional variations in the parts, and their relationships, while using valve mounts and gate structures similar to those already shown and described, may be readily employed by those skilled in the art.

In one such variation, found convenient and efficient, in the nature of a sleeve insert, somewhat similar to the sleeve mount in the normally-closed version, rather than disposed generally in the upper part of the valve mechanism, is generally in the lower half and shaped to fit, at its lower end, inside the mouth of the sleeve against the top of the disk spring. It, thus, substantially blocks upward flexing of the disk spring. Then the valve mount is screwed into a long stem running into an elongated inner opening through the sleeve insert, with the stem movable up and down in the opening. The spring or springs, then abut the lower end of the stem, above, and a shoulder of the valve mount, below.

In this normally-open arrangement, additionally, the sleeve extends further upward than in the normally-closed version, within an adjustable nut near the top. The movable controller is then normally mounted within the upper half of the sleeve and has a lower stem extending into the sleeve insert opening from above. For convenience, a bushing, tubular in shape, made of a metallic oxide material, such as a synthetic sapphire or ruby material can be used as a bearing for the up and down movement of the two stems within the sleeve insert opening, and as a coupler to receive the stems into its two ends. For purposes of the magnetic circuit, a non-magnetic cap is threaded in the adjustable nut and in a lock nut, above the movable controller. For mounting purposes, the sleeve is press-fit on the cap within the adjustable nut, and welded to the cap to provide an hermetic seal. The gap in the magnetic circuit, then, is between the top of the sleeve insert and the bottom of the non-stem portion of the movable controller.

As indicated, the basic operational relationship between the valve mount and valve gate structure, with their abutting surfaces, the form of the valve mount as it relates to this relationship, and the form of the gate structure, are unaffected by the normally-open alternative. Of course, with the valve mechanism not in operation, the gate structure will separate from the valve mount and rest against the valve seat. And with the valve in operation, but in its base, normally-open position, the spring or springs will hold up the valve mount, along with other parts, and if the strength of the gas flow is sufficient, the force of the flow will maintain the gate structure against the valve mount. In normal operation, with the valve adjusted to a desired downward position, thus with the spring or springs flexing downwardly, as in the normally-closed version, the gas flow will maintain the gate structure, abutting the valve mount.

As has been indicated, and is also readily apparent, many changes and modifications may be made in the embodiments which have been shown and described to adapt to a variety of conditions and requirements, without departing from the spirit and scope of the invention.

What is claimed is:

1. A valve mechanism to control the flow of a fluid, comprising:

pipe structure for carrying the fluid;

a valve seat mounted in said pipe structure;

a movable valve controller;

a valve gate structure having a curved surface facing said valve seat and a substantially flat surface; and a gate structure mount movable with said controller having a substantially flat mounting surface facing said substantially flat gate structure surface , said substantially flat gate structure surface held abutting said substantially flat mounting surface substantially solely through non-structural force while said valve gate structure is separated from said valve seat during operation.

2. A valve mechanism as defined in claim 1, wherein:

said gate structure is unattached.

3. A valve mechanism defined in claim 1, wherein:

said substantially flat surface of said gate structure is held abutting said substantially flat mounting surface by the flow of the fluid through said valve seat while said valve gate structure is separated from said valve seat during operation.

4. A valve mechanism as defined in claim 1, wherein:

said substantially flat mounting surface is broken by a curved surface.

5. A valve mechanism as defined in claim 1, further comprising:

a solenoid actuator to move said controller and adjust the flow of the fluid through said valve seat.

6. A valve mechanism as defined in claim 5, wherein said solenoid actuator comprises:

a sleeve of a non-magnetic material about said controller; and a solenoid coil about said sleeve to provide a magnetic field to move said controller.

7. A valve mechanism as defined in claim 1, wherein said gate structure comprises:

a holder having said substantially flat gate structure surface; and a ball member held in said holder having said curved gate structure surface.

8. A valve mechanism as defined in claim 1, wherein:

said curved gate structure surface has a spherical shape.

9. A valve mechanism to control the flow of a fluid, comprising:

pipe structure for carrying the fluid;

a valve seat mounted in said pipe structure;

a movable valve controller;

an unattached valve gate structure having a substantially flat surface; and a gate structure mount movable with said controller having a substantially flat mounting surface facing said substantially flat gate structure surface, said substantially flat gate structure surface held abutting said substantially flat mounting surface substantially solely through non-structural force while said valve gate structure is separated from said valve seat during operation.

10. A valve mechanism as defined in claim 9, wherein:

said gate structure has a curved surface.

11. A valve mechanism as defined in claim 10, wherein:

said curved gate structure surface has a spherical shape.

12. A valve mechanism as defined in claim 9, wherein:

said substantially flat surface of said gate structure is held abutting said substantially flat mounting surface by the flow of the fluid through said valve seat while said valve gate structure is separated from said valve seat during operation.

13. A valve mechanism as defined in claim 9, wherein:

said substantially flat mounting surface is broken by a curved surface.

14. A valve mechanism as defined in claim 9, further comprising:

a solenoid actuator to move said controller and adjust the flow of the fluid through said valve seat.

15. A valve mechanism as defined in claim 14, wherein said solenoid actuator comprises:

a sleeve of non-magnetic material about said controller; and a solenoid coil about said sleeve to provide a magnetic field to move said controller.

16. A valve mechanism as defined in claim 9, wherein said gate structure comprises:

a holder having said substantially flat gate structure surface; and a ball member held in said holder having a curved gate structure surface.

* * * * *